UNITED STATES PATENT OFFICE.

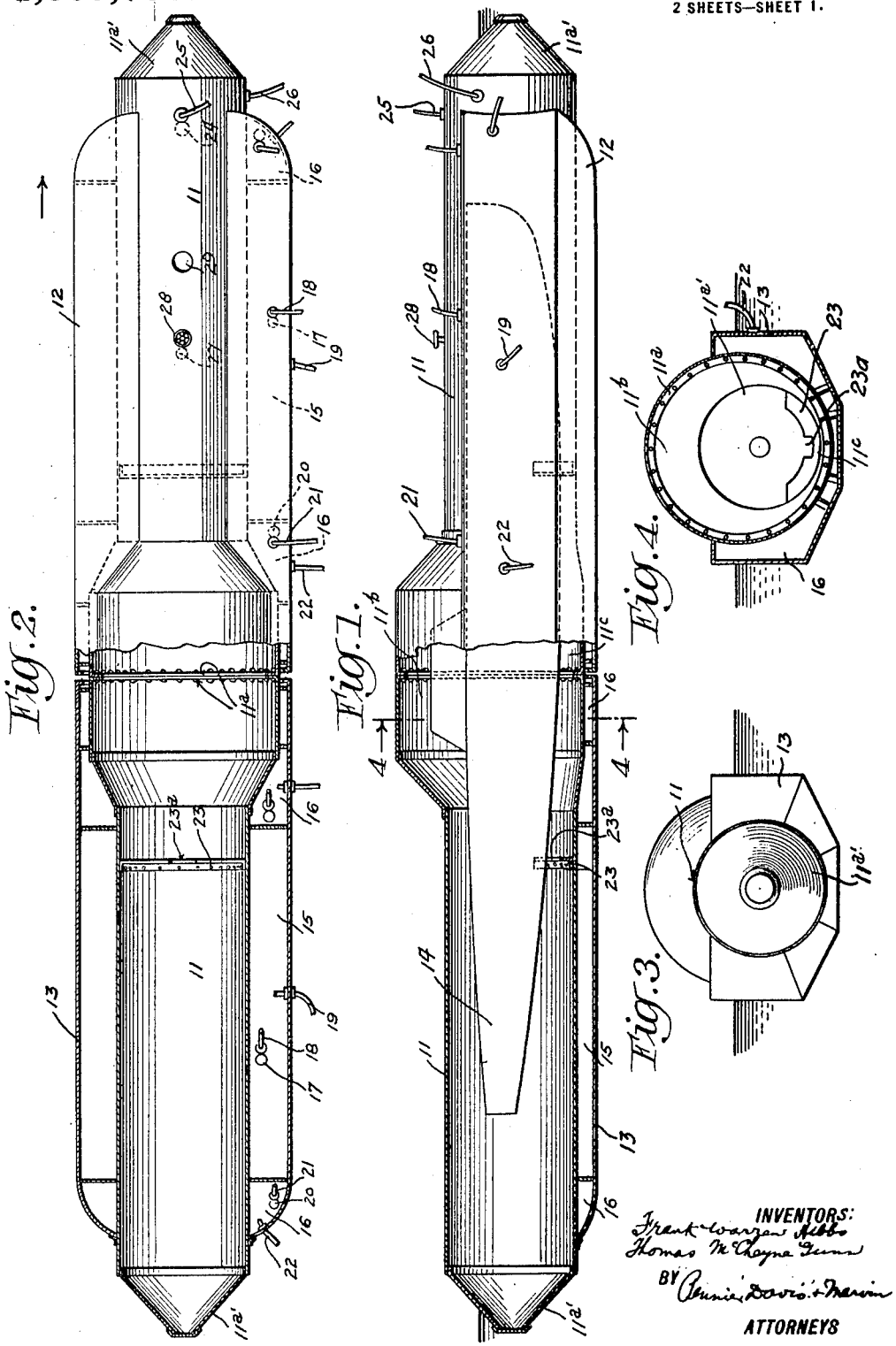

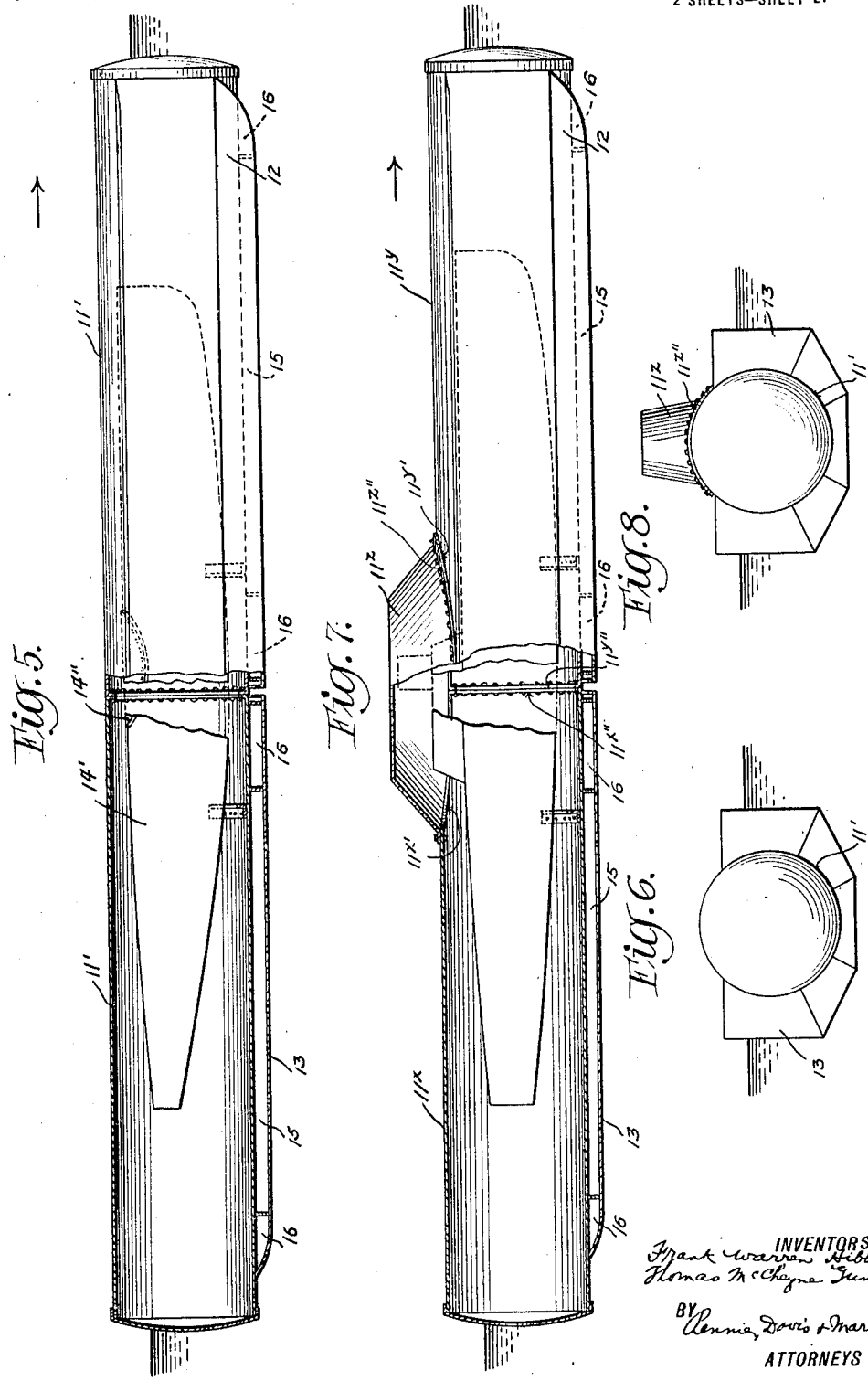

FRANK WARREN HIBBS AND THOMAS McCHEYNE GUNN, OF NEW LONDON, CONNECTICUT, ASSIGNORS TO ELECTRIC BOAT COMPANY, A CORPORATION OF NEW JERSEY.

TESTING-TANK FOR SUBMARINES.

1,309,736.  Specification of Letters Patent.  Patented July 15, 1919.

Application filed March 24, 1916. Serial No. 86,521.

*To all whom it may concern:*

Be it known that we, FRANK WARREN HIBBS and THOMAS McCHEYNE GUNN, both citizens of the United States, and residents of New London, in the county of New London and State of Connecticut, respectively, have invented certain new and useful Improvements in Testing-Tanks for Submarines; and we do hereby declare the following to be a full, clear, and exact description of the invention, such as will enable others skilled in the art to which it appertains to make and use the same.

This invention provides a preferably submergible testing tank organization, or enveloping vessel suitable also for use as a repair ship, tow or dry-dock, for submarines.

The enveloping vessel preferably includes one or more floats, pontoons or caissons, provided with ballast tanks, with trimming tanks and with flooding and emptying connections for said tanks, in combination with a submarine-envelop, which may be termed the testing tank, attached to the caisson.

Since an embodiment of the invention may also serve as a repair ship, tow or dry-dock for the contained submarine, the testing tank is preferably provided with a hatch opening and removable cover therefor whereby workmen may have access to its interior, and for this purpose, among others, the interior dimensions of the testing tank are substantially greater than the over-all dimensions of the submarine.

To the end that when the testing tank is submerged the hull-strength of the submarine contained therein may be tested, the testing tank will preferably be provided with its own flooding and emptying connections and with one or more valves and adjustable controllers for said valves, whereby such hull-strength may be tested by the sea-pressure at the depth of submergence, or by compressed air alone, with the caissons either completely or only partially submerged, or by compressed air admitted to the interior of the testing tank when it is partially or wholly flooded with water.

In the accompanying drawings, which illustrate two embodiments of the invention as at present preferred.

Figure 1 is a side elevation, partially in section, of one of said embodiments, showing a submarine in the testing tank;

Fig. 2 is a top plan view, partially in section, of the same embodiment with the submarine removed;

Fig. 3 is an end elevation of the embodiment of Figs. 1 and 2;

Fig. 4 is a transverse sectional view taken on the line 4—4 of Fig. 1, with the submarine removed;

Fig. 5 is a view similar to Fig. 1, but showing another embodiment;

Fig. 6 is an end elevation thereof;

Fig. 7 is a view similar to Figs. 1 and 5, showing another embodiment; and

Fig. 8 is an end elevation thereof.

The testing tank of Figs. 1 to 4 comprises two symmetrical halves or longitudinal subdivisions 11, each terminating in an annular inturned flange 11$^a$. To one of these halves of the testing tank is permanently attached the forward caisson 12, and to the other is attached the aft caisson 13. A submarine to be tested, say the submarine 14, is floated or otherwise partially contained within either of the subdivisions 11, and the other subdivision 11 may be floated or otherwise arranged about the protruding portion of the submarine 14, to bring the flanges 11$^a$ against each other and thereby permit the bolting together of the two subdivisions to establish the testing tank as a container or envelop for the submarine, sealed at the flanges 11$^a$.

Each caisson is provided with its own ballast tank 15 and with its own forward and aft trimming tanks 16, each of the ballast tanks being equipped with a sea-valve 17, an air connection 18 for opening or closing each valve 17, and an air connection 19 for admitting air to each tank 15 to expel water-ballast therefrom, and each of the trimming tanks being provided with its own sea-valve 20, an air connection 21 for opening or closing each valve 20, and an air connection 22 for admitting air to each tank 16 to expel water-ballast therefrom.

It will be noted that the testing tank established by connecting the subdivisions 11 thereof as aforesaid is of a type well calculated to withstand deep submergence pressures, if desired, since it is composed of a plurality of cylindrical lengths and a plurality of end walls 11$^{a'}$, the latter being conical, with their convexities external to the testing tank.

The central cylindrical enlargement establishes a cupola 11<sup>b</sup> and a shallow floor depression 11<sup>c</sup>.

Depression 11<sup>c</sup> performs a valuable function in that, while facilitating an assembly of the previously separated subdivisions 11 of the testing tank when a launched submarine is partially enveloped by one of the subdivisions, said depression after the subdivisions are closely drawn together provides a working space beneath the bottom of the submarine and between the cradles 23 upon which the submarine finally rests, and within which workmen may reach the portions of flanges 11<sup>a</sup> which lie below the central hull enlargement of the submarine and bolt together these portions of said flanges. The cradle openings 23<sup>a</sup> permit the passage of workmen along the floor of the tank lengthwise of the submarine. Another advantage resulting from the presence of the depression 11<sup>c</sup> is the fact that the cradles need not be very high, with the result that a submarine may be supported on the cradles without unduly increasing the diameter of the cylindrical end sections of the testing tank, and without unduly decreasing the metacentric height of the enveloping vessel when containing a submarine, no matter how much water ballast is carried by the vessel.

Cupola 11<sup>b</sup> is obviously present to accommodate the conning tower of the enveloped submarine.

The testing tank is provided with a sea-valve 24, with an air connection 25 for opening and closing the sea-valve, and with a second connection 26 for feeding compressed air to the interior of the testing tank to expel water therefrom. The testing tank is also preferably provided with a suitable sea-valve 27, of the well known shaft-operated type, and a controlling hand-wheel 28 therefor. The testing tank is further provided with a circular hatch 29 which will have a suitable hatch-cover (not shown). It will be understood that the air-connections referred to include flexible air pipes which extend to a surface source of air supply, as on shore or on an attending vessel, when the testing tank organization is submerged.

The operation of this embodiment of the invention is substantially as follows:

To test the hull-strength of a submarine the subdivisions 11 of the testing tank are disconnected and one of them, say the aft one, is brought to a suitable degree of partial submergence, the air connections 18, 19, 21 and 22 of its tanks 15 and 16 being employed for the purpose, and is towed toward submarine 14 and the aft half of the submarine is nested therein. Then the forward subdivision 11 is likewise brought to a suitable degree of partial submergence, and is towed toward the projecting forward half of the submarine until the flanges 11<sup>a</sup> meet. Water is then blown out of the testing tank until the submarine rests on the cradles 23 of Fig. 1 as illustrated. The flanges 11<sup>a</sup> are then bolted together, members of the crew which had entered the hatch 29 for this work emerging through said hatch. Such bolting together of these flanges may be expeditiously done, since in all cases the flanges may be easily brought into proper registry by suitably flooding and emptying various ones of the four trimming tanks 16 by employing air connections 21 and 22.

If it is desired to test the hull-strength of the submarine 14 by applying thereto a deep submergence pressure as the result of admitting sea-water to the interior of the testing tank at a certain submerged depth of the enveloping vessel, hatch 29 is closed and the air connections 25 and 18 are then employed to open the sea-valves and flood the testing tank and then the ballast tanks 15 so as to submerge the vessel, the air-connections 21 and 22 being employed to trim the testing tank before submergence. The tanks 15 will preferably be of such capacity that the structure as a whole will retain some reserve buoyancy when those tanks are completely filled and this reserve buoyancy will be overcome and the vessel sunk to the desired depth, by admitting measured quantities of water to the midship trimming tanks 16, which thus sufficiently serve the purpose in the united structure, of the customary midship auxiliary tank and adjusting tank of a submarine. When the test is concluded, the connections 18, 19, 21, 22, 25 and 26 are employed to empty the ballast tanks 15 and to control the contents of the trimming tanks 16 and the testing tank so as to cause the vessel to rise to the surface on an even keel. The hand-wheel 28 may be used alternately with the air connection 25, since the ballast tanks 15 and 16 are of sufficient capacity to submerge or to float the vessel as a whole and consequently the flooding and emptying of the testing tank may be done at the surface if desired. Water may be discharged from the testing tank by air connection 26, to any desired extent and after disconnecting the flanges 11<sup>a</sup> either of the subdivisions 11 may be towed away from the other, and the submarine may be floated free from the enveloping vessel.

If it is desired to test the hull-strength of the submarine by submerging the testing organization to a less depth than a depth whereat the submergence pressure equals the test pressure, the air connections above mentioned or suitable hydraulic pumps may be employed to increase to the desired point the pressure of submergence.

If it is desired to apply the hull-strength test merely as the result of using compressed air alone, it is only necessary to close hatch 29 and then employ connection 26 to admit air under suitable pressure to the interior of the testing tank. For the purposes of this test, of course, the ballast tanks of the caissons may be so adjusted that the testing tank is wholly or partially submerged or even above the surface. But preferably the testing tank will be just so much submerged before the testing air pressure is admitted thereto, that the submergence pressure of the water surrounding the testing tank will in a measure relieve the bulging strain upon the walls thereof.

The enveloping vessel may also serve when desired as a dry-dock for a submarine which needs repairs. When used for that purpose the halves of the testing tank are brought together to inclose the submarine and to be coupled by bolts or the like as above described and the water is blown or drained out of the testing tank. Workmen may then enter hatch 29 and repair the submarine as required. In this connection it will be observed that the testing tank will preferably be of such dimensions that the deck of the submarine will be sufficiently spaced below the roof of the testing tank to permit the hatches of the submarine to be opened and access to be had to the interior thereof.

The embodiment of Figs. 5 and 6 shows an organization generally similar to that just described. In this embodiment, however, the testing tank consists of two plain cylindrical subdivisions 11' as illustrated, whereby a submarine 14' may be enveloped in the assembled testing tank. Submarine 14' is at such a stage of construction or so temporarily dismantled that its conning-tower is not present, and therefore there is shown an auxiliary plate 14'' positioned on said submarine to seal the usual opening in the shell thereof provided for subsequent closure by the conning-tower structure. The embodiment of Fig. 5 will include caissons and controlling adjuncts (not shown) corresponding to those illustrated and described with reference to Figs. 1 to 4.

Figs. 7 and 8 show an organization also generally similar to that of Fig. 1. In this embodiment, however, the testing tank includes three separable sections $11^x$, $11^y$ and $11^z$ as illustrated. The sections $11^x$ and $11^y$ are plain cylindrical sections, cut away as indicated at $11^{x'}$ and $11^{y'}$ so as to have mounted thereon, by bolts or the like, the section $11^z$. The section $11^z$ is merely a conning-tower hood, provided with an outstanding base-flange $11^{z'}$ as illustrated, so that after the flanges $11^{x''}$ and $11^{y''}$ are bolted together, the flange $11^{z''}$ may be bolted to the main body of the thus partially assembled testing tank, thereby to seal the interior of said tank.

It will be observed from the foregoing that the apparatus is capable of varied uses even if the ballast tanks are not of sufficient capacity to completely submerge it, or if the tanks, being of sufficient capacity to submerge it, are nevertheless used only for varying the surface displacement of, and for trimming, the individual tank subdivisions or the vessel as a whole.

We claim:

1. In an apparatus of the kind described, in combination, a testing-tank including a plurality of separable hollow tank-subdivisions, a ballast tank carried by each of said subdivisions, and means for flooding and emptying said tanks.

2. In an apparatus of the kind described, in combination, a testing-tank including a plurality of separable hollow tank-subdivisions, ballast tanks carried by said subdivisions, and means for flooding and emptying said ballast tanks, trimming tanks carried by said subdivisions, and means for flooding and emptying said trimming tanks.

3. In an apparatus of the kind described, in combination, a testing-tank including a pair of symmetrically arranged separable longitudinal subdivisions, a pair of spaced trimming tanks and an intermediate ballast tank attached to each of said subdivisions, and means for flooding and emptying said tanks.

4. In an apparatus of the kind described, in combination, a testing-tank including a pair of symmetrically arranged separable longitudinal subdivisions, a pair of spaced trimming tanks and an intermediate ballast tank attached to each of said subdivisions, and means for flooding and emptying said tanks, the capacity of the ballast tanks being such that the apparatus has reserve buoyancy when these tanks and the testing tank are flooded, whereby the midship trimming tanks serve as an auxiliary and adjusting tank.

5. In an apparatus of the kind described, in combination, a generally cylindrical testing-tank including a pair of symmetrically arranged separable longitudinal subdivisions each so formed that when assembled the tank is provided with a substantially central depression in the tank-floor, a ballast tank carried by each of said subdivisions, and means for flooding and emptying said tanks.

6. In an apparatus of the kind described, in combination, a testing-tank including a plurality of separable tank-subdivisions, a ballast tank carried by each of said subdivisions, means for flooding and emptying said tanks, and means for admitting compressed air to the interior of the testing-tank when assembled.

7. In an apparatus of the kind described, in combination, a testing-tank including a plurality of separable tank-subdivisions, a ballast tank carried by each of said subdivisions, means for flooding and emptying said ballast tanks, and means for flooding and emptying the testing-tank.

8. In an apparatus of the kind described, a testing-tank including a plurality of separable tank subdivisions, each carrying at its open end an inturned flange whereby when the subdivisions are brought together to establish a submarine envelop one flange may be attached to the other.

9. In an apparatus of the kind described, a testing-tank including a plurality of separable tank subdivisions, each subdivision carrying at its open end an inturned flange whereby when the subdivisions are brought together to establish a submarine envelop one flange may be attached to the other, and cradles one of which is carried by and interiorly of each of the subdivisions, said cradles being so located that the enveloped submarine may rest upon the cradles leaving between the testing-tank and the hull of the enveloped submarine an annular working space adjacent the flanges.

In testimony whereof we affix our signatures.

FRANK WARREN HIBBS.
THOMAS McCHEYNE GUNN.

Copies of this patent may be obtained for five cents each, by addressing the "Commissioner of Patents, Washington, D. C."